(12) United States Patent
Moseley (10) Patent No.: US 11,951,489 B2
(45) Date of Patent: Apr. 9, 2024

(54) SEPARATION DEVICE FOR SEPARATING A FLUID

(71) Applicant: The Big Swing Company Ltd, Gloucestershire (GB)

(72) Inventor: Jonathan Charles Moseley, Gloucestershire (GB)

(73) Assignee: The Big Swing Company Ltd (GB)

( * ) Notice: Subject to any disclaimer, the term of this patent is extended or adjusted under 35 U.S.C. 154(b) by 764 days.

(21) Appl. No.: 16/090,553

(22) PCT Filed: Mar. 31, 2017

(86) PCT No.: PCT/GB2017/050922
§ 371 (c)(1),
(2) Date: Oct. 1, 2018

(87) PCT Pub. No.: WO2017/168175
PCT Pub. Date: Oct. 5, 2017

(65) Prior Publication Data
US 2019/0118192 A1    Apr. 25, 2019

(30) Foreign Application Priority Data

Apr. 1, 2016 (GB) .................................... 1605627

(51) Int. Cl.
*B04C 5/14* (2006.01)
*B01D 21/00* (2006.01)
(Continued)

(52) U.S. Cl.
CPC ............ *B04C 5/14* (2013.01); *B01D 21/0009* (2013.01); *B01D 21/265* (2013.01);
(Continued)

(58) Field of Classification Search
CPC .... B04C 5/14; B04C 5/04; B04C 5/28; B04C 2009/001; B04C 2009/007; B01D 21/0009; B01D 21/265; B01D 21/267; E21B 43/34
See application file for complete search history.

(56) References Cited

U.S. PATENT DOCUMENTS 3,235,090 A * 2/1966 Bose .................... B01D 21/267
210/512.1
3,351,195 A * 11/1967 Hukki .................... B01D 21/26
209/39

(Continued)

FOREIGN PATENT DOCUMENTS

CN      202194700 U  *  4/2012
CN      202194700 U     4/2012
(Continued)

OTHER PUBLICATIONS

Intellectual Property Office of Singapore, Written Opinion, dated Dec. 19, 2019.

*Primary Examiner* — Liam Royce
(74) *Attorney, Agent, or Firm* — Umberg Zipser LLP; Ryan Dean (57) ABSTRACT

According to the present invention there is provided a separation device for separating a fluid, said fluid comprising multiple components, into at least two components comprising: a support structure; at least one conduit mounted on or within said support structure for rotation about an axis; at least one inlet for introducing a flow of said fluid into said at least one conduit; and at least one outlet for outputting at least one of said components therefrom; wherein the said at least one conduit is configured such that, in use, when said flow of said fluid is applied thereto, said (Continued)

conduit is thereby caused to rotate on or within said support structure about said axis, thereby separating said fluid into at least two components.

21 Claims, 7 Drawing Sheets

(51) Int. Cl.
  *B01D 21/26* (2006.01)
  *B04C 5/04* (2006.01)
  *B04C 5/28* (2006.01)
  *B04C 9/00* (2006.01)
  *E21B 43/34* (2006.01)

(52) U.S. Cl.
  CPC ............. *B01D 21/267* (2013.01); *B04C 5/04* (2013.01); *B04C 5/28* (2013.01); *E21B 43/35* (2020.05); *B04C 2009/001* (2013.01); *B04C 2009/007* (2013.01)

(56) References Cited

U.S. PATENT DOCUMENTS

| | | | | |
|---|---|---|---|---|
| 3,905,197 | A | * 9/1975 | Miller | ........................ F02C 6/00 |
| | | | | 60/646 |
| 4,230,581 | A | 10/1980 | Beazley | |
| 2002/0033098 | A1 | 3/2002 | Hiltunen | |
| 2005/0224426 | A1 | 10/2005 | Arefjord | |
| 2006/0096933 | A1 | 5/2006 | Maier | |
| 2010/0206166 | A1 | 8/2010 | Tuomas | |
| 2013/0210598 | A1* | 8/2013 | Kidd | ........................ B04B 5/10 |
| | | | | 494/31 |

FOREIGN PATENT DOCUMENTS

| | | |
|---|---|---|
| CN | 103285624 A | 9/2013 |
| CN | 204563684 U | 8/2015 |
| FR | 904772 | 11/1945 |
| GB | 726616 A | 3/1955 |
| GB | 2367510 A | 4/2002 |
| JP | 2003144979 A | 5/2003 |
| JP | 2006281034 A | 10/2006 |
| RU | 2180260 C | 3/2002 |
| WO | 8101110 A1 | 4/1981 |
| WO | 2012009159 A2 | 1/2012 |
| WO | 2012012143 A2 | 1/2012 |

* cited by examiner

SEPARATION DEVICE FOR SEPARATING A FLUID

This invention relates to a separation device suitable for separating a fluid, said fluid comprising multiple components, into at least two components and to a method of separating said fluid into at least two components.

The separation of a fluid mixture into component parts is an important industrial process in many applications, for example in purification and extraction processes. In the upstream oil and gas market for example, the multiple fluids produced from the well are required to be stabilized (primarily via pressure let-down), with the separated gas and liquid streams each being treated to meet export specifications. In the case of the liquid stream, impurities, such as salts, sand and water, as well as any gas in solution must be removed from the crude oil. These impurities can reduce the value of the crude oil and have a detrimental effect (such as corrosion and erosion) on downstream equipment. Similarly for the associated water stream, oil and gas in the water needs to be removed, and sometimes also any particulates such as sand, to meet the specified limits required for the selected disposal method. It is therefore of great importance to remove contaminants from the extracted fluid mixture.

The separation of a static fluid mixture will occur naturally via the force of gravity. The natural driving force of liquid droplets, solid particles or gas bubbles rising or falling through a main liquid or gas phase is defined by Stokes' Law (equation 1).

$$V_s = \frac{2}{9} \frac{(\rho_p - \rho_f)}{\mu} g R^2 \quad (1)$$

In this equation $V_s$ is the settling velocity of the particle, droplet or bubble (m s$^{-1}$); $\rho_p$ is the mass density of the particle, droplet or bubble (kg m$^{-3}$); $\rho_f$ is the mass density of the fluid (kg m$^{-3}$); g is the gravitational acceleration (m s$^{-2}$); R is the particle, droplet or bubble radius (m); and $\mu$ is the dynamic viscosity of the fluid (kg m$^{-1}$ s$^{-1}$). Equation 1 indicates that the settling velocity is directly proportional to the gravitational acceleration. Therefore an increase in the gravitational acceleration will increase the settling velocity and proportionally reduce the separation time. Separation techniques, such as hydrocyclones and centrifuges, are based on imparting high gravitational acceleration to fluids to separate a fluid mixture into its individual components.

Figure 1:
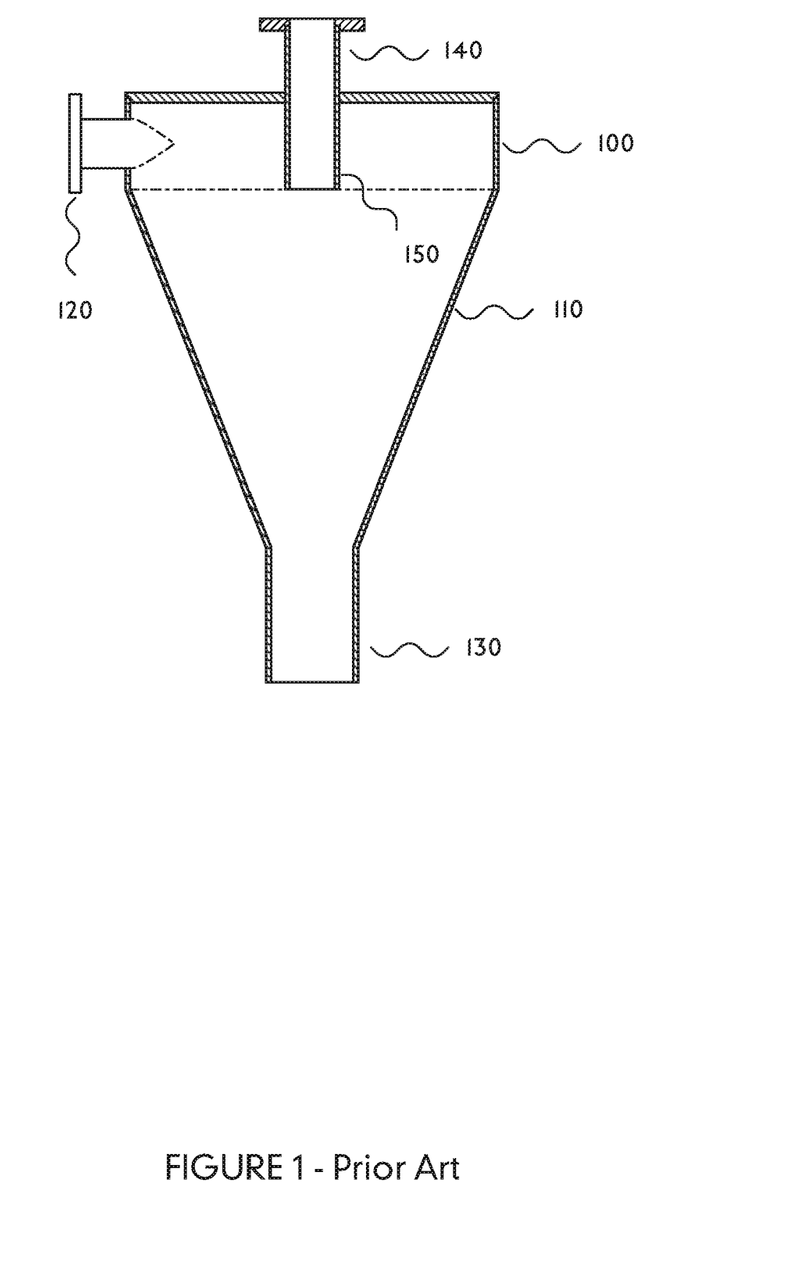
FIG. 1 is a schematic cross-sectional view of a cyclone (prior art)

Hydrocyclones, hereinafter referred to as cyclones, are static separation devices that use centrifugal forces to separate a fluid mixture into at least two components. A typical cyclone is shown in FIG. 1, and comprises a cylindrical first chamber (or swirl chamber) 100, a separation chamber 110, an inlet nozzle 120, an underflow outlet nozzle 130 and an overflow outlet nozzle 140. The inlet nozzle 120 is typically tangential to the cylindrical first chamber (or swirl chamber) 100. For optimum performance the separation chamber 110 is typically tapered or conical. The overflow outlet nozzle, usually near the cyclone inlet, may also comprise a vortex finder 150. The fluid mixture enters the cylindrical first chamber (or swirl chamber) under pressure via the tangential inlet nozzle. The swirl chamber helps to induce a rotational spin on the fluid mixture prior to the fluid mixture entering the separation chamber. The rotational spin at the inlet causes the fluid flow profile to form a free vortex in the separation chamber, where centrifugal forces act to separate the fluid into components of different densities. The centrifugal forces cause denser particles or phases to concentrate towards the walls of the conical separation chamber and the less dense particles or phases to accumulate towards the rotational axis of the vortex. Typically the denser components flow to the bottom of the conical separation chamber, where they can be removed via the underflow outlet nozzle 130. The less dense phases flow to the top of the conical separation chamber where they can be extracted via the vortex finder/overflow outlet nozzle.

Liquid/liquid cyclones may, for example, be used to separate oil droplets from water, however droplet removal efficiency rapidly declines for oil droplets with a diameter less than around 20 μm. In liquid/liquid cyclones, the lighter liquid phase together with free gas, pass via the vortex finder to the overflow outlet. The heavier liquid phase is removed via the underflow outlet. In liquid/solid and gas/solid cyclones, the bulk component, that is the liquid and gas phase respectively, pass via a vortex finder to the overflow outlet. The denser solid components are removed via the underflow outlet. In both liquid/liquid and liquid/solid cyclones, the tapered walls of the cyclone help to maintain the acceleration forces along the length of the cyclone. However, this results in a larger pressure drop between the inlet and outlet nozzles. This pressure drop can lead to system design problems, for example, if insufficient system pressure is available an upstream pump set may be required increasing the size and cost of the equipment required.

In the upstream oil and gas market, fluids produced from a well, typically arriving at high pressure, are a combination of oil, gas, water and solid particles. Most commonly oil droplets are removed from the oilfield produced water using liquid/liquid cyclones, and solid particles are removed using liquid/solid cyclones. The liquid/liquid cyclones (de-oiling package) and liquid/solid cyclones (de-sanding package) are provided as separate and discrete pieces of equipment. In some instances, particularly offshore, weight and space limitations can inhibit the use of two separate de-oiling and de-sanding packages. Furthermore, inadequate upstream system pressure can limit the cyclones operating at their optimum separation efficiency.

Centrifuges provide an alternative centrifugal method for separating a fluid mixture into its component parts whereby the separation is achieved by rotation of the separator wall. The centrifugal force created forces the denser components to accumulate towards the walls of the separation chamber and the less dense components to concentrate towards the axis of rotation. The power for rotating the chamber is provided via a shaft driven by a motor. The external power supply and motor required to achieve suitable centrifugal forces can greatly increase the size and cost of manufacture and operation of the centrifuge. By virtue of their relative mechanical design complexity, and the need for a motor drive, with associated seals, bearings, lubrication and cooling circuits, centrifuges are significantly more expensive, heavier and take up more space than a cyclone designed for the same capacity. Centrifuges typically establish a bulk rotary flow of the fluid mixture normally without the free vortex that is established in a cyclone. This can result in lower centrifugal forces and reduced separation efficiency in the vicinity of the axis compared to a cyclone for the same throughput.

Centrifuges can be designed to provide higher gravitational acceleration forces compared with cyclones and therefore theoretically achieve higher separation efficiencies, for example, in the separation of water droplets from crude oil, centrifuges may remove water droplets with a diameter in the range of 2 μm and above. Centrifuges have been used on difficult separation duties on oil production applications, such as on heavy oil fields where the density of the oil is close to the density of the water and is beyond the separation capabilities of a hydrocyclone. However, such centrifuge designs are often limited to relatively low throughput operation and to relatively low operating pressures—typically at or near atmospheric pressure. Centrifuges also commonly require dedicated inlet feed pumps, which further increases the size, manufacturing costs, operating costs and power consumption of the machinery.

Thus, known devices and methods for separating a fluid mixture into component parts have a number of limitations associated therewith, and aspects of the present invention, in at least some of its embodiments, seek to address at least some of the above described problems and wants.

According to the first aspect of the invention there is provided a separation device for separating a fluid, said fluid comprising multiple components, into at least two components comprising:

a support structure;

at least one conduit mounted on or within said support structure for rotation about an axis;

at least one inlet for introducing a flow of said fluid into said at least one conduit; and at least one outlet for outputting at least one of said components therefrom;

wherein the said at least one conduit is configured such that, in use, when said flow of said fluid is applied thereto, said conduit is thereby caused to rotate on or within said support structure about said axis, thereby separating said fluid into at least two components.

The said at least one conduit may be a separation tube.

The said at least one conduit may be configured such that, in use, when said flow of said fluid having a non-zero velocity component in a direction parallel to said axis is applied thereto, said conduit is thereby caused to rotate on or within said support structure about said axis, thereby separating said fluid into at least two components.

The said at least one conduit may be configured such that, in use, when a flow of said fluid in a direction substantially parallel to said axis is applied thereto, said conduit is caused thereby to rotate on or within said outer support structure about said axis, thereby separating said fluid into at least two components.

The said at least one conduit may be configured such that, in use, when said flow of said fluid is applied thereto from said inlet, said conduit is thereby caused to rotate on or within said support structure about said axis, thereby separating said fluid into at least two components.

The fluid may be comprised of at least one liquid phase. The fluid may be comprised of at least two liquid phases. The fluid may be comprised of an aqueous phase and an oil phase. The fluid may be comprised of at least one gaseous phase. The fluid may be comprised of an aqueous phase, an oil phase and a gaseous phase. The fluid may be comprised of at least one solid phase. The fluid may be comprised of an aqueous phase, an oil phase, a gaseous phase and a solid phase, or any combination thereof.

The at least one conduit may comprise a tube. The tube may have a constant or varying diameter along its length. The tube may have a constant or varying internal diameter along its length. The tube may have a constant or varying external diameter along its length. The tube may be a cylindrical tube.

The at least one conduit may comprise one or more vanes attached to or formed integrally with the said conduit. The vanes may be turbine blades, impellers, propellers, stators, spiral internals, ribs, fins, or similar, or any combination thereof (all generally referred to herein as vanes).

The said vanes may be attached to or formed integrally with an inner surface of said conduit.

The said vanes may comprise a central axle. The vanes may freely rotate around the central axle. The central axle may comprise at least one of an inlet or an outlet.

The at least one conduit may be mounted on bearings. The bearings may contact either the outer or inner surface of the conduit. The bearings may be installed together with an appropriate type of seal arrangement.

The support structure may be an inner support structure such that it is disposed inside of at least one conduit. The support structure may be an outer support structure such that it is disposed outside of at least one conduit. The support structure may comprise a housing. The at least one conduit may be mounted on bearings inside or outside the support structure or housing.

The at least one outlet may comprise an overflow outlet. The overflow outlet may comprise a vortex finder.

The at least one outlet may comprise an underflow outlet.

The at least one inlet may be tangential to at least one conduit.

The separation device may further comprise an inlet chamber. The inlet chamber may be a swirl chamber. The swirl chamber helps to induce a rotational spin on the fluid prior to the fluid entering the conduit. The rotational spin of the fluid induced by the swirl chamber may be enhanced through use of a tangential inlet.

The diameter of at least one conduit may be between 3 mm and 3 m.

The diameter of the said at least one conduit may preferably be between 30 mm and 60 mm.

The length of at least one conduit may be between 40 mm and 3 m.

The length of at least one conduit may preferably be between 0.5 m and 1.1 m.

The at least one conduit may be a plurality of conduits.

The at least one inlet may introduce a flow of said fluid to said plurality of conduits.

The separation device may further comprise a generator. The generator may be an external generator. The at least one conduit may be configured such that, in use, when said flow of said fluid is applied thereto, said conduit is thereby caused to rotate about said axis, thereby causing the generator to generate electrical power.

The separation device may further comprise an electrostatic field generation device for generating an electrostatic field so that the fluid experiences an electrostatic force which enhances the separation efficiency of the separation device. The electrostatic field may be supplied so that at least one component of the fluid coalesces. The at least one component that coalesces may comprise droplets, particles or bubbles. The at least one component that coalesces may be a liquid phase, preferably an aqueous phase. The separation device may further comprise an electrostatic coalescer suitable for electrostatically coalescing at least one component in the fluid.

Electrical power for generating the electrostatic field may be at least partially generated by the generator.

According to a second aspect of the invention there is provided a method for separating a fluid, said fluid comprising multiple components, into at least two components using a separation device according to the first aspect of the invention, the method comprising the steps of:

introducing a flow of said fluid into said conduit, via said inlet;

thereby causing said conduit to rotate on or within said support structure about said axis, thereby separating said fluid into at least two components.

The said flow may have a non-zero velocity component in a direction parallel to the said axis of rotation.

The said flow may be in a direction substantially parallel to the said axis of rotation.

The fluid may be comprised of at least one liquid phase. The fluid may be comprised of at least two liquid phases. The fluid may be comprised of an aqueous phase and an oil phase. The fluid may be comprised of at least one gaseous phase. The fluid may be comprised of an aqueous phase, an oil phase, and a gaseous phase. The fluid may be comprised of at least one solid phase. The fluid may be comprised of an aqueous phase, an oil phase, a gaseous phase, and a solid phase, or any combination thereof.

The at least one phase may comprise droplets, particles or bubbles with a diameter predominantly greater than 2 μm. That is, at least half of the droplets, particles or bubbles may have a diameter greater than 2 μm.

The pressure differential between an inlet and an outlet is dependent upon several parameters including the conduit diameter and length, the fluid flow rate, and the rotational speed of the conduit. The separation device can be designed to make full use of the available system pressure in order to optimize its performance. In a number of embodiments, the pressure of fluid in at least one outlet may not be more than 0.8 bar less than the pressure of fluid in at least one inlet.

The step of causing said conduit to rotate about said axis may cause a generator to generate electrical power.

An electrostatic field may be generated so that the fluid experiences an electrostatic force, which enhances the separation efficiency of the separation device. The electrostatic field may be supplied so that at least one component of the fluid coalesces. The at least one component that coalesces may comprise droplets, particles or bubbles. The at least one component that coalesces may be a liquid phase, preferably an aqueous phase. The method may further comprise electrostatically coalescing at least one component in the fluid.

Electrical power for supplying the electrostatic field may be at least partially generated by the generator.

Whilst the invention has been described above, it extends to any inventive combination of the features set out above, or in the following description, drawings or claims. For example, any feature described in relation with one aspect of the invention is considered to be disclosed also in relation to any other aspect of the invention.

Embodiments of the present invention will now be described, by way of examples only, and with reference to the accompanying drawings, in which.

Figure 2:
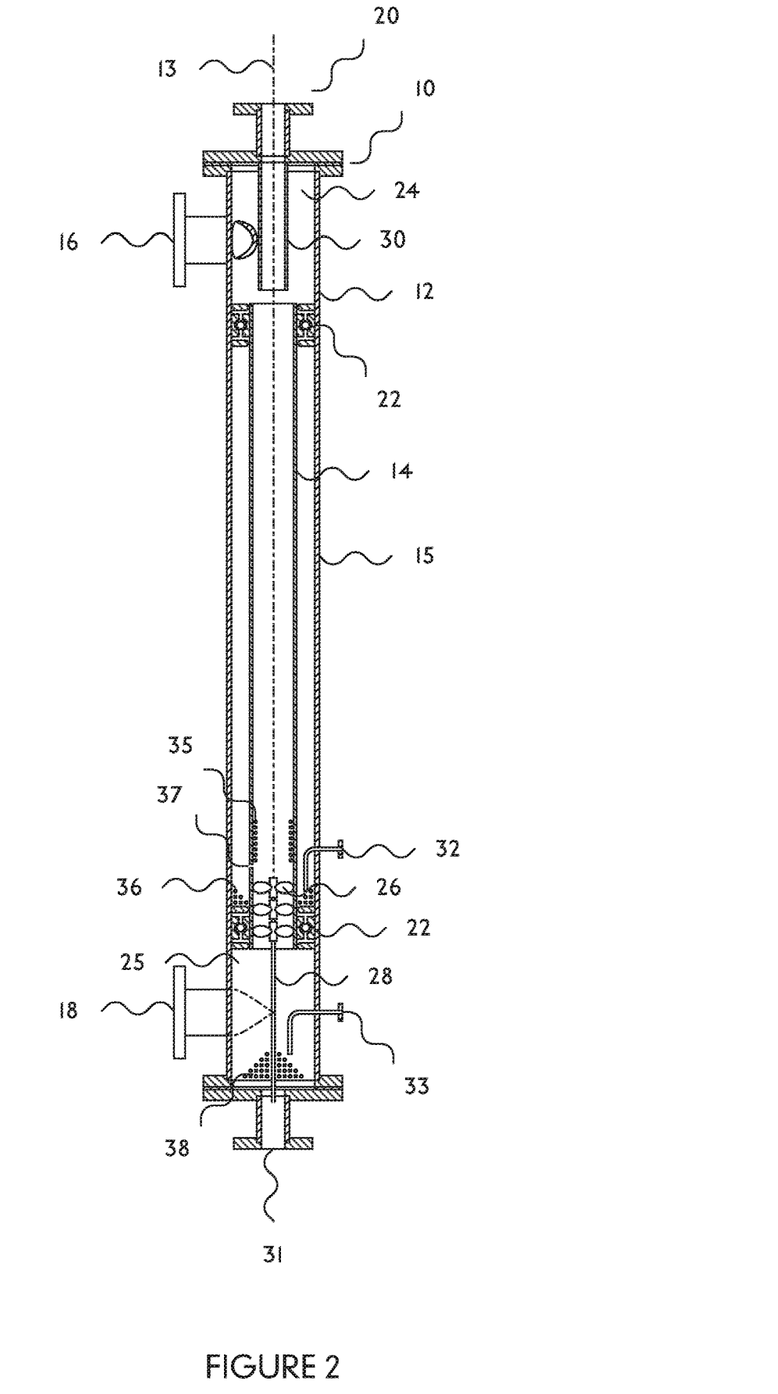
FIG. 2 is a schematic cross-sectional view of a first exemplary embodiment of a separation device suitable for separating a fluid, said fluid comprising multiple components, into at least two components.
Figure 3:
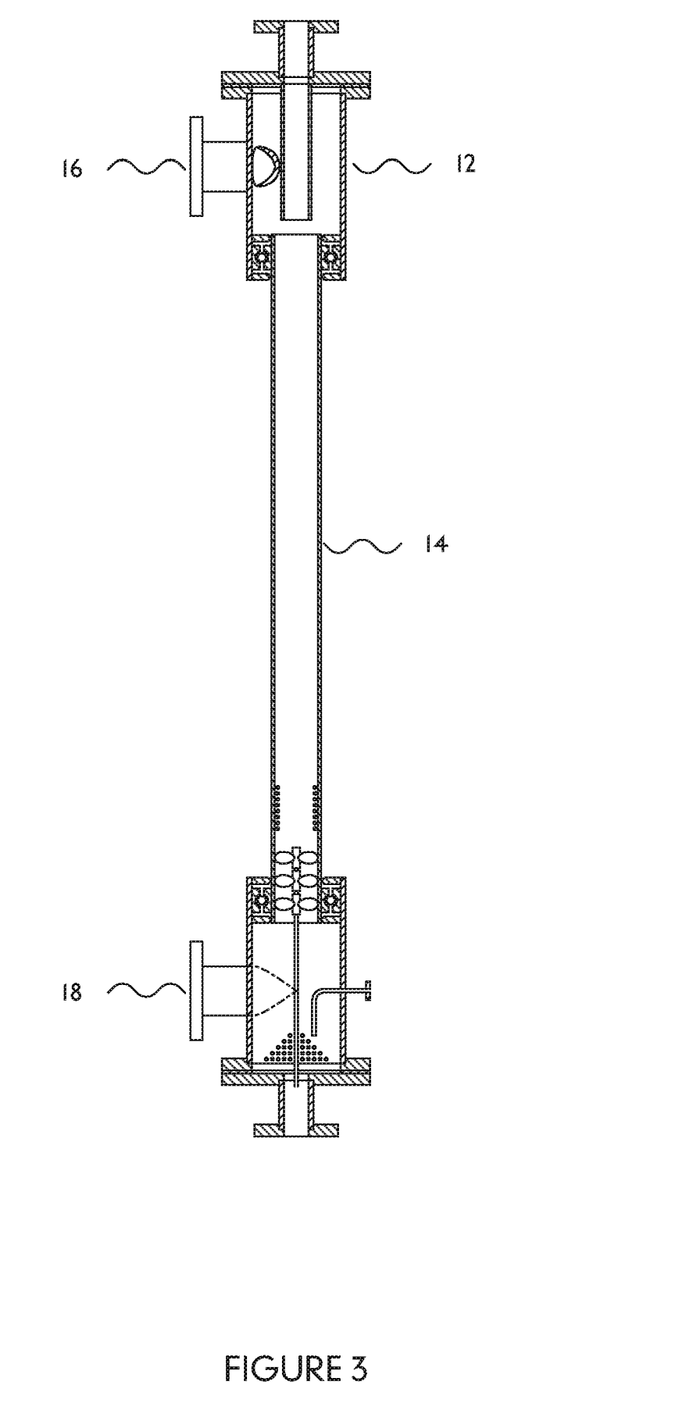
FIG. 3 is a schematic cross-sectional view of a second exemplary embodiment of a separation device which does not comprise a housing.

A first exemplary embodiment of the invention is shown in FIG. 2. The separation device 10 comprises an outer support structure 12, a conduit such as a separation tube 14, an inlet nozzle 16, an underflow outlet nozzle 18 and an overflow outlet nozzle 20. In this embodiment the separation tube 14 is a cylindrical tube, although the invention is not limited by the geometry of the separation tube. The separation tube 14 can rotate about its longitudinal axis 13 relative to the outer support structure 12. When in use the separation tube 14 contains a fluid mixture. The rotation of the separation tube 14 together with any rotational flow induced into the fluid at the inlet to the separation tube generates a centrifugal force causing denser components of the fluid to accumulate towards the walls of the separation tube 14 whereas the less dense components accumulate near the axis of rotation 13. The separation tube 14 is mounted onto or within the outer support structure 12 by a series of bearings 22, which enable free rotation of the separation tube, minimize the friction and reduce the rate of mechanical wear between the rotating separation tube 14 and the outer support structure 12. The outer support structure 12 and the separation tube 14 may be designed to withstand the full upstream system pressure. In some embodiments the outer support structure 12 may comprise a housing 15, which may be designed to withstand the full upstream system pressure, in which case the design pressure of the separation tube 14 could be reduced. FIG. 3 shows a second exemplary embodiment of a separation device where the outer support structure 12 does not comprise a housing. Where the same reference numerals have been used in different exemplary embodiments, the reference numerals correspond to features that are identical. In a further embodiment the separation tube 14 may be mounted to the outer support structure 12 at each end on a central shaft.

Fluid enters the inlet chamber 24 via the inlet nozzle 16. The inlet chamber 24 is preferably cylindrical. The inlet nozzle 16 is preferentially tangential (either clockwise or anti-clockwise) to the cylindrical inlet chamber 24, such that the rotational spin of the fluid is partially or fully established prior to entering the separation tube 14. Further embodiments may include an inlet device, such as a swirl chamber, in the inlet chamber 24, and an outlet device in the outlet chamber 25. The inlet device or swirl chamber helps to induce a rotational spin on the inlet fluid prior to the fluid entering the separation tube. The inlet device or swirl chamber may comprise a vortex finder. The outlet device helps to segregate separated components of the inlet fluid.

Figure 4:
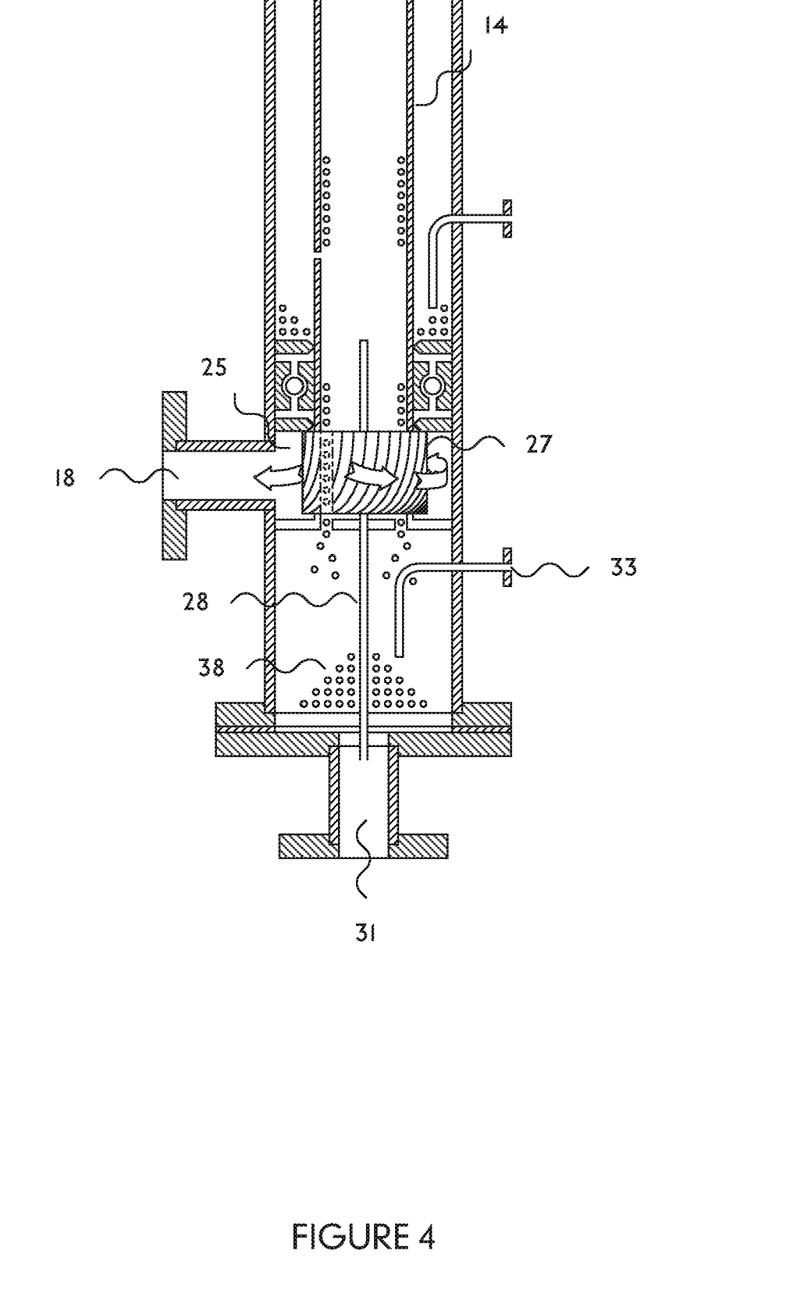
FIG. 4 is a schematic cross-sectional view of a third exemplary embodiment of a separation device with vanes outside of the separation tube.

The inlet nozzle 16 may be orientated axially. However, the invention is not limited by the orientation of the inlet nozzle 16 nor the incorporation of an inlet device, such as a swirl chamber. The fluid is forced under pressure from the inlet chamber 24 into the separation tube 14. The internal bore of the separation tube 14 comprises vanes 26 which are attached to or integrally part of the internal surface of the separation tube 14. A central axle 28 may be included to provide support to the vanes 26. In some embodiments the vanes 26 may freely rotate around the central axle 28 and other internal components. The central axle 28 may be configured as a tube to enable the removal of the fluid collected at the central core or to allow the injection of an external fluid. As fluid flows along the separation tube 14, and through the vanes 26, a rotational force is generated causing the separation tube 14 to rotate about its longitudinal axis. The vanes 26 are preferentially, although not necessarily, positioned at the downstream end of the separation tube 14 in order to minimize turbulence and shear forces in the separation section of the separation tube 14. In one exemplary embodiment, shown in FIG. 4, the vanes 27 are attached to, or formed integrally with, the downstream cross-sectional end of the separation tube 14. In this embodiment the vanes 27 are located in the outlet chamber 25 rather than in the internal bore of the separation tube 14. In other embodiments the vanes may be located in the inlet chamber 24 and attached to the upstream cross-sectional end of the separation tube 14. The vanes 26 or 27 may be configured such that they, and hence the separation tube 14, are caused to rotate when subjected to a fluid flow that has a non-zero velocity component parallel to the axis of rotation, that is to say an axial velocity component. In another embodiment the vanes 26 or 27 may be configured such that they, and hence the separation tube 14, are caused to rotate when subjected to a fluid flow that has a non-zero velocity component perpendicular to the axis of rotation, that is to say a radial velocity component. Where sufficient inlet pressure is available, additional vanes 26 may be installed to increase the rotation speed of the tube, and the resultant centrifugal force. If a longer residence time could be beneficial, or if it is deemed to be beneficial to the process the length or the diameter of the separation tube 14 could be increased.

The rotation of the separation tube 14 together with any rotational spin induced at the fluid inlet maintains or increases the spiral or rotating flow profile of the fluid. The rotation of the fluid mixture within the separation tube 14 establishes a vortex in the fluid mixture. A centrifugal force causes denser components of the fluid mixture to accumulate towards the walls of the separation tube 14 whereas the less dense components accumulate near the axis of rotation. The denser components of the fluid mixture may be extracted using underflow outlet nozzle 18 or outlet nozzle 31. Further embodiments may include multiple outlet nozzles. In further embodiments separated solids 35 can be accumulated in a quiescent zone either to an accumulation zone 36 via slots in the wall of the separation tube 37 or to an accumulation zone 38 beyond the rotating separation tube, where they may be removed respectively using a jetting or fluidization device or an alternative established method, for example via nozzles 32 or 33. The less dense components may be extracted from an overflow outlet nozzle 20, or via an additional underflow nozzle 31. In further embodiments the overflow outlet nozzle 20 may include a vortex finder 30. The separation device can be installed in any orientation including horizontal or vertical since the centrifugal forces created are such that the external impact of gravity is minimal.

Figure 5:
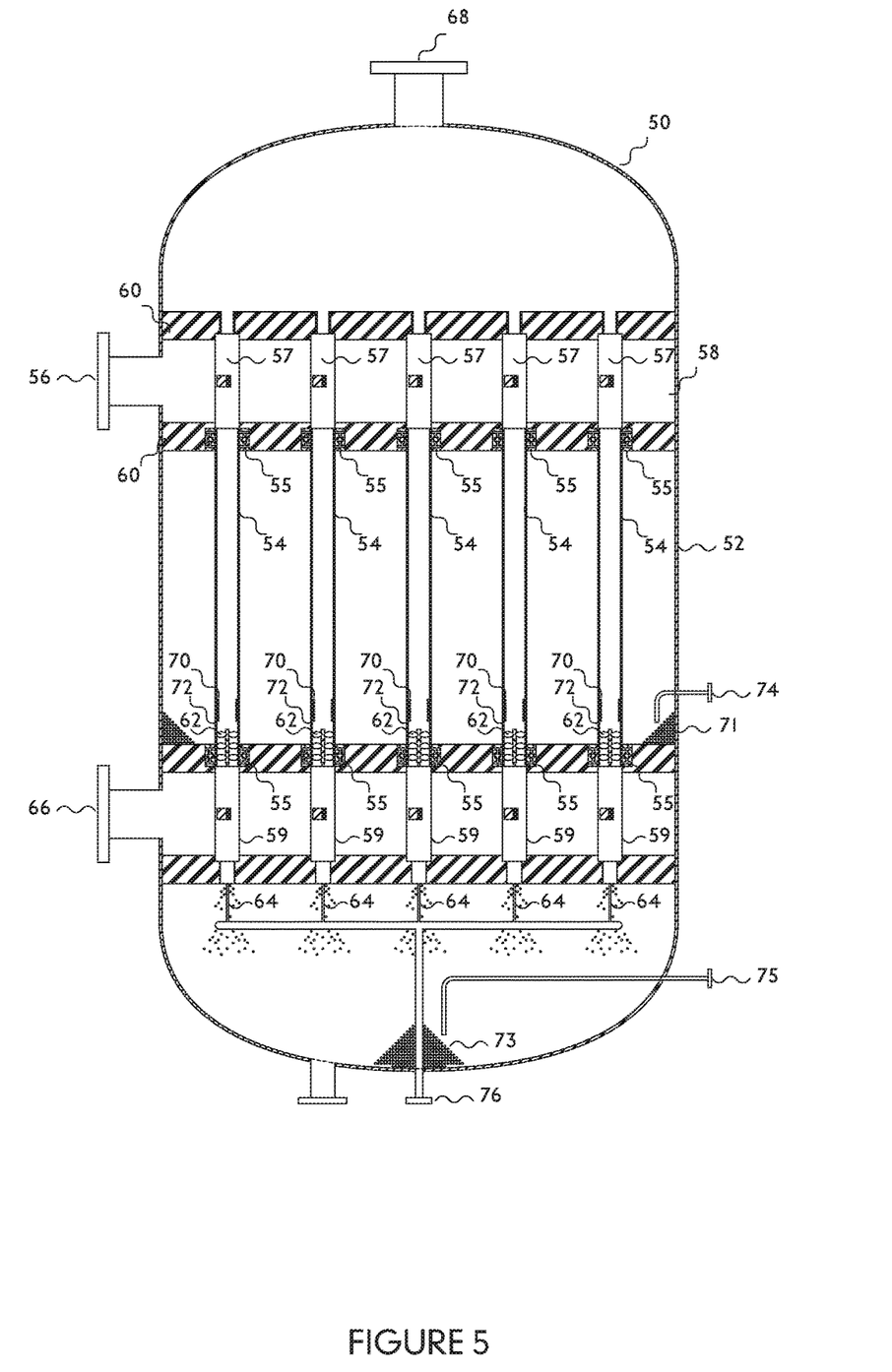
FIG. 5 is a schematic view of a third exemplary embodiment of a separation device containing a multiplicity of separation tubes.

A third exemplary embodiment of the invention is shown in FIG. 5. The separation device 50 comprises an outer support structure 52, which may be designed to withstand the full upstream system pressure, and a multiplicity of separation tubes 54. In this embodiment each separation tube in the multiplicity of separation tubes 54 is considered to be cylindrical. Each separation tube of the multiplicity of separation tubes 54 may rotate independently of the other separation tubes along the longitudinal axis. When in use, each separation tube of the multiplicity of separation tubes 54 contains a fluid mixture. The rotation of each individual separation tube together with any rotational flow induced into the fluid at the inlet to the separation tube generates a centrifugal force which causes denser components of the fluid to accumulate towards the wall of said rotating separation tube whereas the less dense components accumulate near the axis of rotation. The multiplicity of separation tubes 54 is mounted inside the outer support structure 52 by a series of bearings 55, which enable free rotation of the separation tubes, minimize the friction and reduce the rate of mechanical wear between the rotating separation tubes and the outer support structure 52.

Fluid enters the separation device 50 via the inlet nozzle 56. Further embodiments may include multiple inlet nozzles. The fluid is forced under pressure from the inlet chamber 58 into the multiplicity of separation tubes 54. Further embodiments may include an inlet device 57, such as a swirl chamber in the inlet, and an outlet device 59 on the main outlet of each separation tube of the multiplicity of separation tubes 54. The inlet device, or swirl chamber 57, helps to induce a rotational spin to the inlet fluid, and may comprise a vortex finder. The outlet device 59 helps to segregate separated components of the inlet fluid. The inlet device 57 and the outlet device 59 may independently be used in conjunction with all embodiments of the present invention, including the embodiments shown in FIGS. 2 and 3. The separation tubes 54 may be mounted on a tube-plate 60 at each end. The tube-plates 60 provide mechanical support to and form a seal at each end of the multiplicity of separation tubes 54 and of the inlet and outlet devices 57 and 59.

The internal bore of each separation tube of the multiplicity of separation tubes 54 comprises vanes 62 which are attached to or formed integrally with the internal surface of the said separation tube. A central axle 64 may be included to provide support to the vanes 62 and other internal components. In some embodiments the vanes 62 may freely rotate around the central axle 64 and other internal components. The central axle 64 may be configured as a tube to enable the removal of the fluid collected at the central core, or may allow the injection of an external fluid. As fluid flows along each separation tube of the multiplicity of separation tubes 54, and through the vanes 62, a rotational force is generated which causes the said separation tube to rotate about its longitudinal axis. The vanes 62 are preferentially although not necessarily positioned at the downstream end of each separation tube of the multiplicity of separation tubes 54 in order to minimize turbulence and shear forces in the separation section of the device. Where sufficient inlet pressure is available, additional vanes 62 may be installed to increase the rotation speed of each separation tube in the multiplicity of separation tubes 54, and the resultant centrifugal force. If a longer residence time could be beneficial, the length or the diameter of the multiplicity of separation tubes 54 could be increased.

The rotation of each separation tube in the multiplicity of separation tubes 54 induces the fluid mixture inside said separation tube to have a spiral or rotating flow profile. Further, the rotation of each separation tube in the multiplicity of separation tubes 54, together with any rotational flow induced into the fluid at the fluid inlet, maintains or increases the spiral or rotating flow profile of the fluid, and generates a centrifugal force within each separation tube in the multiplicity of separation tubes 54. The rotation of the fluid within each separation tube of the multiplicity of separation tubes 54 establishes a vortex in the fluid mixture inside said separation tube, which is maintained and reinforced by the rotation of said separation tube. The centrifugal force causes denser components of the fluid mixture to accumulate towards the walls of each rotating separation tube whereas the less dense components accumulate near the axis of rotation. The denser components of the fluid mixture may be extracted using the underflow outlet nozzle 66. Further embodiments may include multiple underflow outlet nozzles. The less dense components may be extracted from the overflow outlet nozzle 68, or via an additional underflow nozzle 76.

In further embodiments separated solids 70 can be accumulated in a quiescent zone either to an accumulation zone 71 via slots in the wall of the separation tube 72 or to an accumulation zone 73 beyond the rotating separation tube, where they may be removed using a jetting or fluidization device or an alternative established method, for example via nozzles 74 or 75 respectively.

Further embodiments may include multiple overflow outlet nozzles.

Improved turndown may be achieved by segmenting the separation tubes into a number of compartments with their own inlet and/or outlet nozzle(s), or by mechanically, hydraulically or electrically isolating, or restricting individual separation tubes or multiples of separation tubes.

Figure 6:
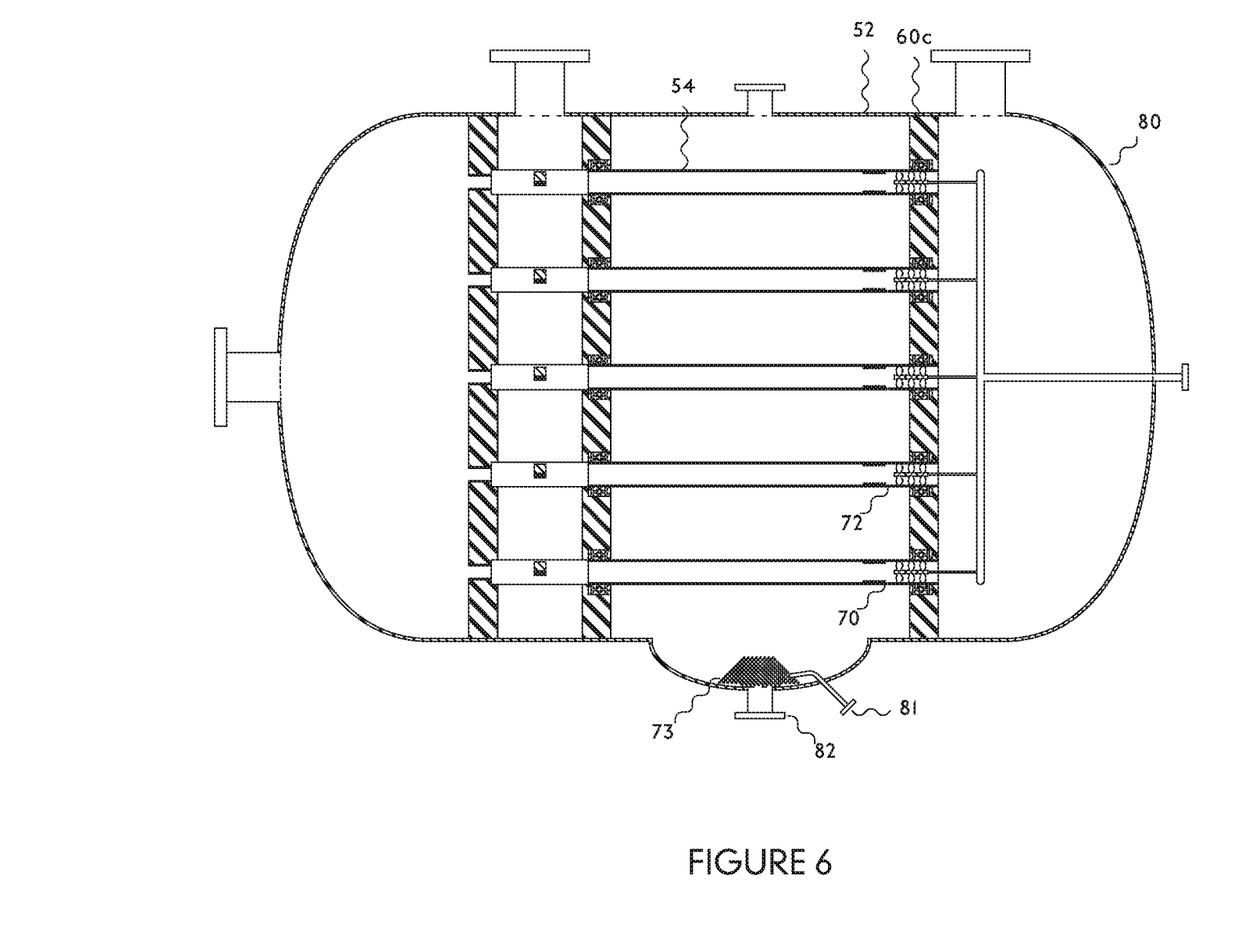
FIG. 6 is a schematic cross-sectional view of a fourth exemplary embodiment of a separation device containing a multiplicity of separation tubes in a horizontal orientation.

A modification of the third exemplary embodiment, separation device 50, is shown as a fourth exemplary embodiment in FIG. 6. Where the same reference numerals have been used in different exemplary embodiments, the reference numerals correspond to features that are identical. The separation device 80 comprises an outer support structure 52 and a multiplicity of separation tubes 54 in a horizontal orientation. The present invention is not limited by the orientation of the multiplicity of the separation tubes 54. The separation tubes 54 encourage denser solid particles to pass through slots in the wall of the separation tube 72 upstream of the tube-plate 60c. The separated solid particles 70 may be collected in an accumulation zone 73, where they can be removed via outlet nozzle 81 or 82. Due to the removal of solid particles upstream of the tube-plate 60c, it is not necessary to incorporate outlet devices 59 or any further downstream tube-plates in this exemplary embodiment, although either or both of these may be included in alternative embodiments.

Further embodiments to the above described embodiments of the separation device are provided hereinafter.

Some exemplary embodiments of the invention may include baffles along the length of the separation tube in order to further enhance its performance.

Embodiments of the invention may include vanes which are or whose mechanism is larger in diameter than the separation tube.

Embodiments of the invention may include vanes whose pitch can be adjusted either manually or automatically.

Embodiments of the invention may include automated monitoring and/or adjustment of the rotational speed of each separation tube.

Embodiments of the invention may include a mechanism such as a screw conveyor or scraper to move collected solids from the internal wall of the separation tube towards the solids accumulation zone or discharge nozzle.

Embodiments of the invention may include a porous or slotted separator tube wall allowing for the incorporation of a filtration or membrane inner wall, which would allow the retention of components of an appropriate size or characteristic at or adjoining the internal wall of the separation tube and/or the passage of components of another appropriate size or characteristic into the accumulation zone.

Embodiments of the invention may include a gas blanket around the separation tube or conduit in order to further minimize friction loss due to being immersed in liquid at the outside wall.

Embodiments of the invention may include injecting gas into the incoming fluid mixture in order to create an enhanced induced gas flotation effect and, thereby improve separation efficiency.

Embodiments of the invention may include injecting a coagulant upstream in order to further improve separation efficiency.

Embodiments of the invention may include adding a dilution liquid upstream in order to further improve separation efficiency.

Figure 7:
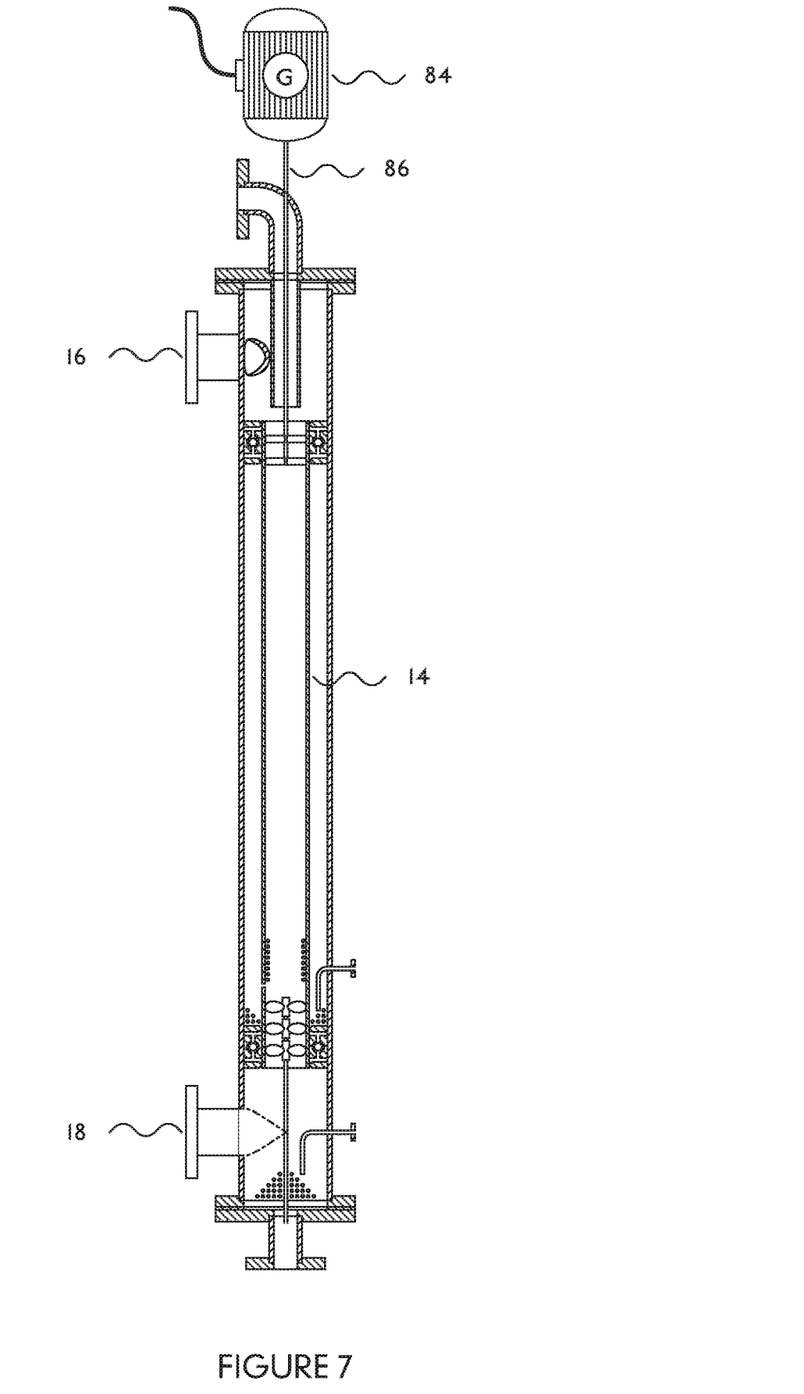
FIG. 7 is a schematic cross-sectional view of an exemplary embodiment of a separation device attached to a generator.

Embodiments of the invention may include connection to a generator. The generator may be an external generator 84 as shown in FIG. 7. The rotation of the separation tube 14 causes the generator to generate electrical power. Where the same reference numerals have been used in different exemplary embodiments, the reference numerals correspond to features that are identical. The external generator 84 is attached via an axle 86 to the separation tube 14. The rotation of the separation tube 14 thereby provides power to the external generator 84.

Embodiments of the invention may include the use of an electrostatic field within the separation tube. Methods of using an electrostatic field to enhance the separation efficiency of a separation device are known in the art. For example, electrostatic coalescers are commonly used in liquid/liquid separation processes including in the upstream oil and gas market for the dehydration and desalting of crude oil prior to its delivery to a refinery. These known methods may be adapted for use in conjunction with all embodiments of the present invention. The electrical power for the electrostatic field may be generated using a generator.

Embodiments of the invention may include connection to a generator and the use of an electrostatic field within the separation tube, wherein the rotation of the separation tube thereby causes the generator to generate electrical power, and the electrical power for the electrostatic field is at least partially generated by the said generator.

Embodiments of the invention may include gas turbo-expander blades at a gas outlet to further improve the separation efficiency or increase energy recovery.

Embodiments of the invention may include Pelton or Francis or Kaplan type vanes or turbine blades on the internal or external wall of the separation tube to further improve the separation efficiency or increase energy recovery should surplus system pressure or fluid be available.

Some embodiments may be suitable for retrofitting within existing liquid-liquid or solid-liquid cyclone vessels in order to improve separation efficiency or improve processing capacity or to operate at a lower pressure drop or a combination thereof.

Exemplary embodiments of the invention may provide a separation device for separating a fluid mixture into at least two components under centrifugal force where a continuous throughput may be achieved without a significant drop in pressure between the fluid mixture entering and exiting the separation device. The invention therefore allows a higher throughput capacity of fluid mixture and/or increased separation efficiency compared to known cyclones of a similar diameter.

A separation device according to various aspects may be suitable for gas/solid, liquid/solid, liquid/liquid, and liquid/gas phase separation or a combination of more than two phases. The fluid mixture may comprise any combination of gases or multiple immiscible liquids of varying densities or solid particles. The separation device could simultaneously de-water, de-oil, de-gas and de-sand or any combination thereof a fluid mixture from an oilfield well or similar process stream, whilst operating at similar or higher efficiency and/or with a lower pressure drop than cyclones.

The separation efficiency of a separation device according to exemplary embodiments approaches those achievable by a centrifuge, whilst not requiring an external motor drive, and exhibiting similar space, weight and cost benefits of a cyclone. The centrifugal force for separation is generated by rotation of at least one conduit where the fluid mixture passes through internal or external vanes, which by virtue of the fluids passing through them impart rotational force on the conduit. The rotational speed of the separation tube imparts and maintains centrifugal forces on the fluid mixture such that separation of the fluid mixture is achieved. An external power supply or external motor is therefore not necessary for the operation of the present invention, although may be incorporated to further improve the separation efficiency or operability of the separation device. Furthermore the present separation device does not require the extent of external seals, bearings, and associated external cooling and lubrication circuits, which are typically needed for the operation of centrifuges.

Embodiments of the present invention can be used as a unit operation in association with other upstream or downstream equipment such as separators, cyclones, flotation units, membranes, coalescers, filters, centrifuges, pumps or valves etc, and additional units of this separation device.

The present invention may find uses in upstream oil and gas (onshore, offshore and subsea), waste-water treatment, minerals processing, mining, pulp and paper processing, nuclear, pharmaceutical, medical, food, drink or automotive applications. One further use may be in the removal of particles or dust from a gas stream operating either under pressure or a vacuum, where the lower pressure drop compared to a cyclone separator would be more energy efficient.

It will be appreciated by a person skilled in the art, from the foregoing description, that modifications and variations can be made to the described embodiments without departing from the scope of the invention as defined by the appended claims.

The invention claimed is:

1. A separation device for separating a fluid, said fluid comprising multiple components, into at least two components comprising:
    a support structure;
    at least one conduit mounted on or within said support structure for rotation about an axis, wherein said at least one conduit is a tube, comprising one or more vanes attached to or formed integrally with said conduit, wherein the conduit and one or more vanes rotate as a single unit;
    at least one inlet for introducing a flow of said fluid into said at least one conduit; and
    at least one outlet for outputting at least one of said components therefrom, wherein the at least one outlet comprises a vortex finder;
    wherein the said at least one conduit is configured such that, in use, when said flow of said fluid is applied thereto, said conduit is thereby caused to rotate on or within said support structure about said axis, thereby separating said fluid into at least two components.

2. The separation device according to claim 1 in which the said vanes comprise a central axle.

3. The separation device according to claim 2 in which the central axle comprises at least one of a first inlet or a first outlet.

4. The separation device according to claim 1, wherein the support structure comprises bearings, and wherein the at least one conduit is mounted on the bearings.

5. The separation device according to claim 1 in which the support structure comprises an inner support structure.

6. The separation device according to claim 1 in which the support structure comprises an outer support structure.

7. The separation device according to claim 1 in which the at least one outlet comprises an overflow outlet comprising the vortex finder and an underflow outlet.

8. The separation device according to claim 1 in which the at least one inlet is tangential to at least one conduit.

9. The separation device according to claim 1 in which the separation device further comprises an inlet chamber.

10. The separation device according to claim 9 in which the inlet chamber comprises a swirl chamber.

11. A separation system, comprising:
    an outer support structure;
    a plurality of separation devices mounted on or within said outer support structure, wherein each of the separation devices comprises the separation device according to claim 1;
    at least one inlet nozzle for introducing a flow of said fluid into the plurality of separation devices; and
    at least one outlet nozzle.

12. A method for separating a fluid, said fluid comprising multiple components, into at least two components using a separation device according to claim 1, the method comprising the steps of:
    introducing a flow of said fluid into said conduit, via said inlet;
    thereby causing said conduit to rotate on or within said support structure about said axis, thereby separating said fluid into at least two components.

13. The method according to claim 12 in which the said flow having a non-zero velocity component in a direction parallel to the said axis of rotation.

14. The method according to claim 12 in which the fluid is comprised of at least one liquid phase.

15. The method according to claim 14 in which the fluid is comprised of at least two liquid phases.

16. The method according to claim 12 in which the fluid is comprised of at least one solid phase, and one of the components that said fluid is separated into is said at least one solid phase.

17. The method according to claim 12 in which the fluid is comprised of at least one phase comprising droplets, particles or bubbles with a diameter predominantly greater than 2 µm.

18. The method according to claim 12 in which the pressure of fluid in at least one outlet is not more than 0.8 bar less than the pressure of fluid in at least one inlet.

19. The method according to claim 12 in which an electrostatic field is generated so that the fluid experiences an electrostatic force which enhances the separation efficiency of the separation device.

20. The separation device according to claim 1 in which the at least one outlet comprises an overflow outlet, and the overflow outlet comprises the vortex finder.

21. The separation device according to claim 1 further comprising a generator, wherein the at least one conduit is configured such that, in use, when said flow of said fluid is applied thereto, said conduit is thereby caused to rotate about said axis, thereby causing the generator to generate electrical power.

\* \* \* \* \*